United States Patent
Liu et al.

(10) Patent No.: US 12,293,317 B2
(45) Date of Patent: May 6, 2025

(54) SMART METER ELECTRICAL ARC PREDICTION

(71) Applicant: Oracle International Corporation, Redwood Shores, CA (US)

(72) Inventors: Cathy Liu, San Francisco, CA (US); Woei Ling Leow, San Francisco, CA (US); Rajagopal Iyengar, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 799 days.

(21) Appl. No.: 16/516,615

(22) Filed: Jul. 19, 2019

(65) Prior Publication Data

US 2021/0018334 A1    Jan. 21, 2021

(51) Int. Cl.
| | | |
|---|---|---|
| *G01D 4/00* | (2006.01) | |
| *G01D 3/08* | (2006.01) | |
| *G01D 4/02* | (2006.01) | |
| *G06F 17/11* | (2006.01) | |
| *G06F 18/214* | (2023.01) | |
| *G06N 20/00* | (2019.01) | |
| *G06Q 10/0631* | (2023.01) | |

(52) U.S. Cl.
CPC ......... *G06Q 10/06315* (2013.01); *G01D 3/08* (2013.01); *G01D 4/002* (2013.01); *G01D 4/02* (2013.01); *G06F 17/11* (2013.01); *G06F 18/214* (2023.01); *G06N 20/00* (2019.01)

(58) Field of Classification Search
None
See application file for complete search history.

(56) References Cited

U.S. PATENT DOCUMENTS

| | | | |
|---|---|---|---|
| 8,145,540 B2 | 3/2012 | Lefevre et al. | |
| 10,310,459 B2 | 6/2019 | Gross et al. | |
| 11,169,498 B2* | 11/2021 | Li | G06Q 50/06 |
| 2004/0211900 A1* | 10/2004 | Johnson | G01J 3/108 |
| | | | 250/338.5 |
| 2008/0212319 A1* | 9/2008 | Klipstein | F21L 4/08 |
| | | | 362/231 |
| 2010/0263709 A1* | 10/2010 | Norman | H10F 77/488 |
| | | | 136/246 |

(Continued)

OTHER PUBLICATIONS

Unknown, Hot Sockets in Meter Bases; by leammetering, Jan. 3, 2018, http://www.learnmetering.com/hot-sockets-meter-bases/.

*Primary Examiner* — Shelby A Turner
*Assistant Examiner* — Brandon J Becker
(74) *Attorney, Agent, or Firm* — Potomac Law Group, PLLC

(57) ABSTRACT

Embodiments predict an occurrence of one or more hot sockets among a meter installation of a plurality of smart meters. Embodiments receive historical data over a predefined time period from the plurality of smart meters, the historical data including, for each smart meter, an amount of daily consumption of electricity for the meter, historical meter events for the meter, and all service orders associated with the meter. Embodiments pre-process the historical data to generate hot socket features. Embodiments train a machine algorithm using the hot socket features, and use the trained machine algorithm to predict the occurrence of one or more hot sockets.

17 Claims, 5 Drawing Sheets

(56) References Cited

U.S. PATENT DOCUMENTS

| | | | |
|---|---|---|---|
| 2013/0057408 A1* | 3/2013 | Aiken | H02H 1/0023 |
| | | | 702/58 |
| 2013/0079938 A1* | 3/2013 | Lee | G06Q 30/02 |
| | | | 700/291 |
| 2013/0338839 A1* | 12/2013 | Rogers | F24F 11/57 |
| | | | 700/278 |
| 2014/0327449 A1 | 11/2014 | Shuey et al. | |
| 2015/0143806 A1* | 5/2015 | Friesth | F01K 13/02 |
| | | | 220/592.2 |
| 2015/0167999 A1* | 6/2015 | Seem | F24F 11/64 |
| | | | 700/276 |
| 2017/0076304 A1* | 3/2017 | Toth | G06Q 30/0202 |
| 2017/0358920 A1* | 12/2017 | Galin | H02J 3/46 |
| 2018/0347406 A1* | 12/2018 | Friesth | F24S 25/50 |
| 2019/0171187 A1* | 6/2019 | Cella | G06N 20/00 |
| 2020/0116686 A1* | 4/2020 | Bertini | G01N 33/0006 |
| 2020/0127604 A1* | 4/2020 | Kosharovsky | H02S 50/00 |

\* cited by examiner

SMART METER ELECTRICAL ARC PREDICTION

FIELD

One embodiment is directed generally to smart meters for utilities, and in particular to the predicting hot sockets for smart meters.

BACKGROUND INFORMATION

Utility companies are frequently upgrading older electro-mechanical meters to newer "smart" electricity or utility meters with communication capabilities. For electrical or gas utilities, the adoption of smart meters and an advanced metering infrastructure ("AMI") has been largely driven by regulatory efforts to enable a carbon-free energy system, to support renewable energy load growth, and to enable a smarter energy infrastructure, as well as utilities' internal efforts to provide better customer service while at the same time increasing operational efficiency.

Many of the utility meters being replaced have been in service at residential locations for years. Because a utility meter installation generally does not get serviced or maintained, some of the older meter sockets in which those meters were installed may have deteriorated over time. Installation of a new utility meter into a deteriorated meter socket may create a poor electrical connection even though the meter being installed is in good working order.

Typically, a single-phase American National Standards Institute ("ANSI") utility meter has four blades that extend out of a thermoplastic base. These blades insert into spring loaded jaws of a meter socket that is typically mounted on the wall of a residence. In some of the older residential locations, the jaws of the meter socket may have lost the contact force to mate solidly with the meter blades. An installer may not recognize that one or more blades are not making as good a contact as desired at the time of installation.

Poor electrical connections (i.e., a loose connection) between the meter and socket can create a situation where an electrical arc can develop within the meter-to-socket interface, creating a "hot socket". There have been occasions where house fires have resulted from a sustained arc condition of this meter-socket type.

The loose connection can be caused by the spring loaded jaws that apply force to the terminals on the back of the meter eventually becoming slack, resulting in tiny micro arcs. Another cause is the hot and the cold climate along with fluctuations in the load. As the metal in the terminals heats up and cools down due to the weather and load changes it expands and contracts. Over time, this can cause the jaws to loosen up and overheat.

Attempts have been made to sense "hot socket" conditions by measurement of blade temperature, socket temperature, or meter temperature. Unfortunately, sensing the temperature of these elements during an arc event requires that the arc exist for a sufficiently long time to generate intense heating. There is a possibility that by the time the heat is detected, the arc condition may sufficiently degrade the equipment to create a dangerous situation.

SUMMARY

Embodiments predict an occurrence of one or more hot sockets among a meter installation of a plurality of smart meters. Embodiments receive historical data over a pre-defined time period from the plurality of smart meters, the historical data including, for each smart meter, an amount of daily consumption of electricity for the meter, historical meter events for the meter, and all service orders associated with the meter. Embodiments pre-process the historical data to generate hot socket features. Embodiments train a machine algorithm using the hot socket features, and use the trained machine algorithm to predict the occurrence of one or more hot sockets.

DETAILED DESCRIPTION

Embodiments use machine learning to predict the occurrence of a hot socket at meter installations, specifically at the meter base or socket, which is the receptacle that connects and houses the smart meter. Embodiments generate a list of features/metadata that is input to a machine learning model that is then trained to make the predictions.

Figure 1:
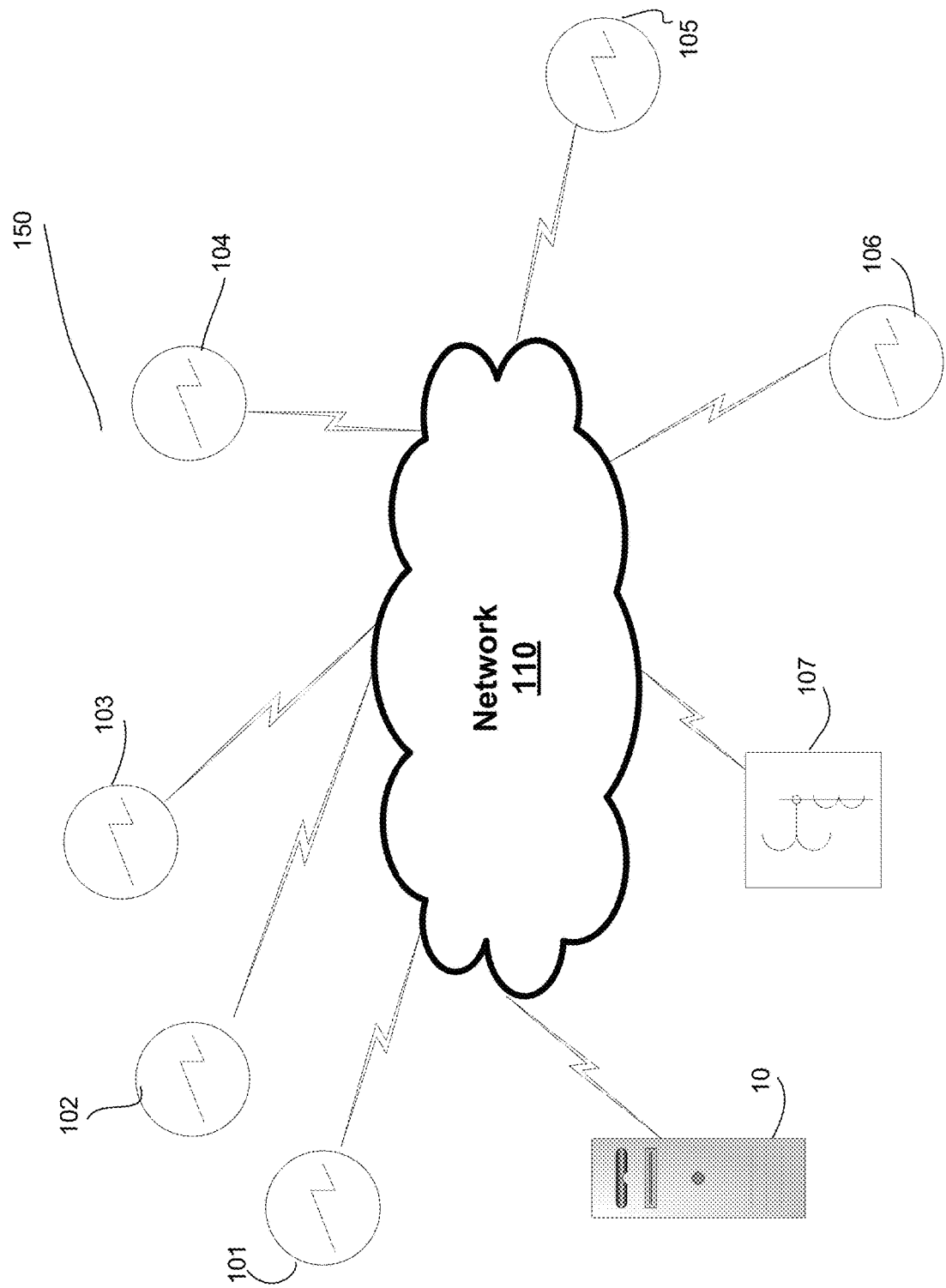
FIG. 1 is an overview diagram of elements of a metering system that can implement embodiments of the invention.

FIG. 1 is an overview diagram of elements of a metering system 150 that can implement embodiments of the invention. System 150 includes multiple meters 101-106 which are operable to sense and record consumption or usage of a service or commodity such as, for example, electricity, water, or gas. Meters 101-106 may be located at customer premises such as, for example, a home or place of business. Meters 101-106 include circuitry for measuring the consumption of the service or commodity being consumed at their respective locations and for generating data reflecting the consumption. Meters 101-106 also include circuitry for wirelessly transmitting data generated by the meter to a remote location over a network 110. Meters 101-106 may also include circuitry for receiving data, commands or instructions wirelessly as well.

System 150 further includes one or more collector meters 107. Collector meters are a special type of smart meter that can serve to collect the radio frequency/microwave radiation signals from many surrounding buildings and send them back to the utility. Collector meters are intended to collect and re-transmit radio frequency information for somewhere between 500-5000 homes or buildings. Meters 101-107 can be provided by many different manufacturers, including Itron, Honeywell Elster and General Electric.

Smart meters 101-106 and collector meter 107 communicate with each other over network 110, which can be any type of network that provides wireless or wired communications, including the Internet, and a mix of different network standards or types of networks. Communications from each meter 101-107 to network 110 may be wireless, or via fixed wired connections such as a power line carrier ("PLC"). Wireless communication options may include cellular communications, Wi-Fi, wireless ad hoc networks over Wi-Fi, wireless mesh networks, low power long range wireless ("LODA"), ZigBee (low power, low data rate wireless), and Wi-SUN (Smart Utility Networks). Also coupled to network 110 is a computer server/system 10 that collects data generated by meters 101-107 and in response generates a prediction of whether a hot socket will result at one of the meters. System 150 as illustrated is a simplified system. In other embodiments, the number of meters 101-107 will number in the thousands or even the millions, and can be spread across hundreds or thousands of miles.

Figure 2:
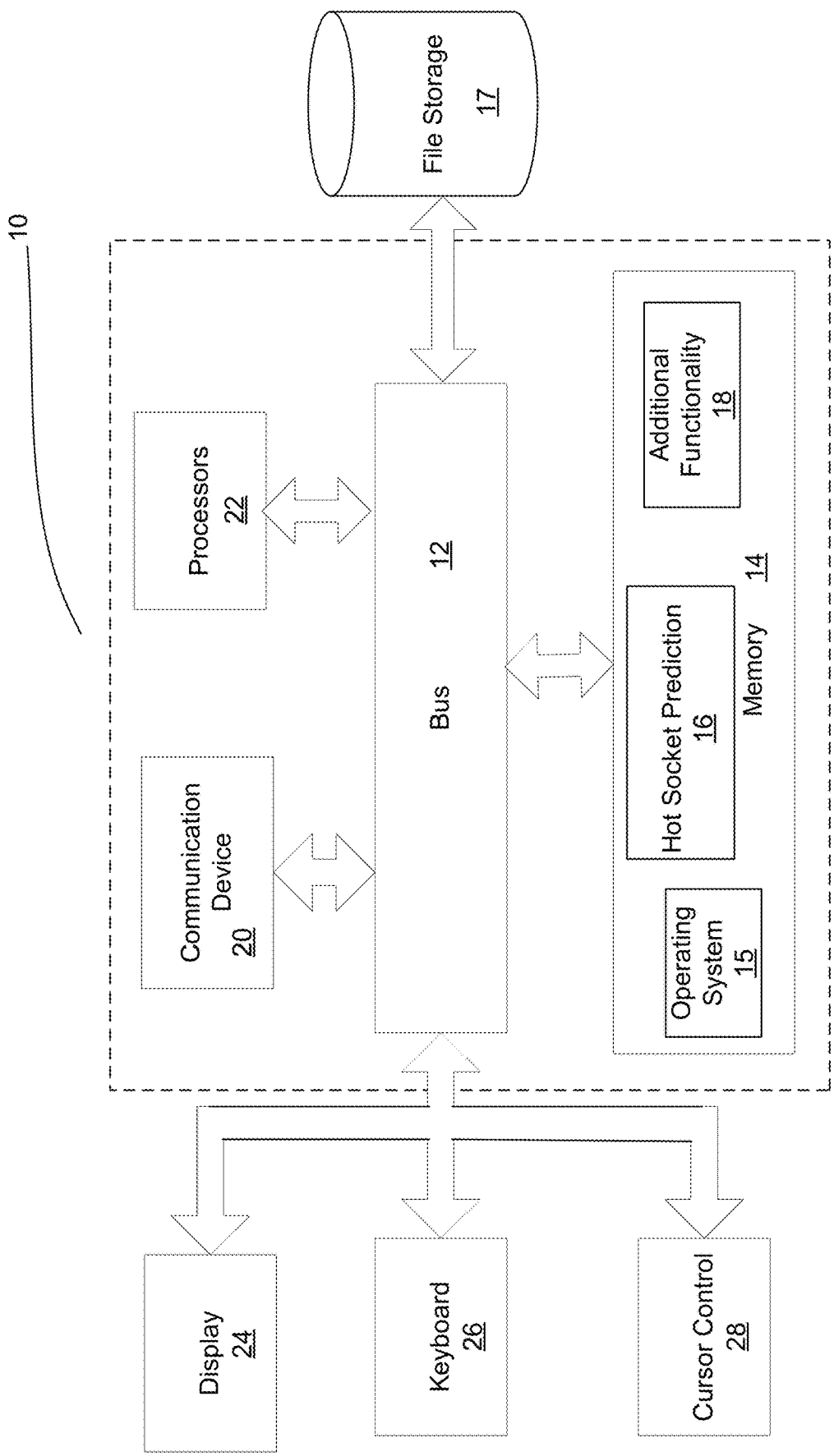
FIG. 2 is a block diagram of the computer server/system of FIG. 1 in accordance with an embodiment of the present invention.

FIG. 2 is a block diagram of computer server/system 10 of FIG. 1 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a hot socket prediction module 16 that predicts hot sockets for one or more smart meter installations, and all other functionality disclosed herein. System 10 can be part of a larger system. Therefore, system 10 can include one or more additional functional modules 18 to include the additional functionality, such as a "Utilities Cloud" from Oracle Corp. A file storage device or database 17 is coupled to bus 12 to provide centralized storage for modules 16 and 18, including the data generate by the smart meters and the generated metadata/features used for machine learning. In one embodiment, database 17 is a relational database management system ("RDBMS") that can use Structured Query Language ("SQL") to manage the stored data.

In one embodiment, particularly when there are a large number distributed files at a single device, database 17 is implemented as an in-memory database ("IMDB"). An IMDB is a database management system that primarily relies on main memory for computer data storage. It is contrasted with database management systems that employ a disk storage mechanism. Main memory databases are faster than disk-optimized databases because disk access is slower than memory access, the internal optimization algorithms are simpler and execute fewer CPU instructions. Accessing data in memory eliminates seek time when querying the data, which provides faster and more predictable performance than disk.

In one embodiment, database 17, when implemented as an IMDB, is implemented based on a distributed data grid. A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability, and information reliability. In particular examples, distributed data grids, such as, e.g., the "Oracle Coherence" data grid from Oracle Corp., store information in-memory to achieve higher performance, and employ redundancy in keeping copies of that information synchronized across multiple servers, thus ensuring resiliency of the system and continued availability of the data in the event of failure of a server.

In one embodiment, system 10 is a computing/data processing system including an application or collection of distributed applications for enterprise organizations, and may also implement logistics, manufacturing, and inventory management functionality. The applications and computing system 10 may be configured to operate with or be implemented as a cloud-based networking system, a software-as-a-service ("SaaS") architecture, or other type of computing solution.

As disclosed, embodiments predict the occurrence of hot sockets at smart meter installations. A hot socket is triggered when a smart meter records an internal temperature exceeding a certain safe threshold, which could be a fire or safety hazard. In the worst case, it could result in the associated structure/premises catching fire, or at least cause irreparable damage to the meter asset which will need replacement at a minimum.

Figure 3:
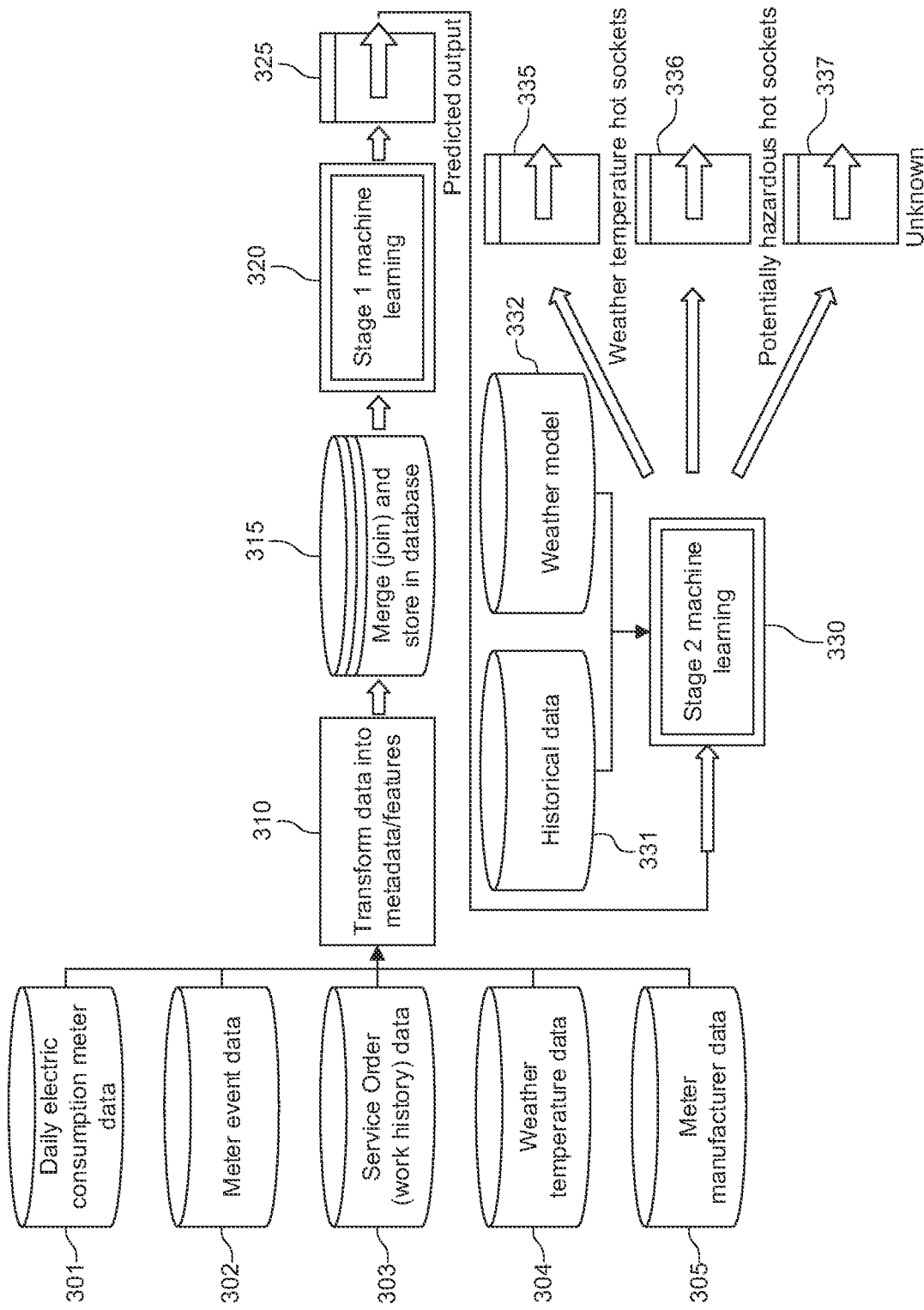
FIG. 3 is a flow diagram of the functionality of the hot socket prediction module of FIG. 2 when predicting hot sockets at smart meter installations in accordance with one embodiment.

FIG. 3 is a flow diagram of the functionality of hot socket prediction module 16 of FIG. 2 when predicting hot sockets at smart meter installations in accordance with one embodiment. In one embodiment, the functionality of the flow diagram of FIG. 3 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

In order to predict the likelihood of occurrence of a hot socket at a particular metering device, embodiments utilize the following sources of data, all over a three month historical time period, or over some other predefined time period: (1) Daily consumption of electricity 301 (in kWh); (2) Historical meter event data 302; (3) History of service orders 303 associated with a specific metering location; (4) Weather temperature data 304; and (5) Meter manufacturer data 305.

Embodiments utilize a joined dataset built using input components 301-305 to differentiate between smart meters that are likely to have hot sockets in the future versus those that will not (i.e., those that will continue to operate as normal). Further, embodiments preprocess the data to create "features" or metadata that are further processed using a machine learning algorithm that accurately separates cases that will show hot sockets in the future versus those that will not.

In connection with daily consumption of electricity 301, weather and electric energy consumption are very closely related. For example, the hotter it gets, electric cooling (or equivalently for electric heating users, the colder it gets in winter), the higher the consumption. Swings between hot and cold weather over time can cause metallic elements in the contact area between the meter and its base to expand and contract. This in turn causes the "jaws" that are used to hold the meter in place to loosen. This loosening facilitates the formation and more frequent arcs of electricity, causing overheating. Specifically, using average and standard deviation of kWh consumption over the historical period are used as a feature to train a machine learning ("ML") model.

In connection with weather temperature data 304, embodiments include additional weather temperature features to the model including: (1) Heating Degree Days (a count of the days during the three months or other time period with temperature less than 55 degrees Fahrenheit); and (2) Cooling Degree Days (a count of the days during the three months or other time period with temperature over 65 degrees Fahrenheit). Embodiments also include a "Season Boolean" (i.e., a "1" or "0" to indicate occurrence or lack thereof) feature to flag the season under consideration as being winter or not. Any meter that is the subject of prediction from October 18 through April 21 is considered a "winter" meter. This cutoff was determined by looking at the historical temperature data of a specific geographical area, but is subject to revision in different geographical areas. The first day that the maximum temperature exceeded 65 days (April 21) is the cutoff for summer, and the first day the that maximum temperature went below 65 days (October 18) is the cutoff for winter.

In embodiments, the average kWh and standard deviation of kWh are capped at 250 and 90 respectively, and all features besides the winter Boolean were normalized.

In connection with historical meter events 302, embodiments assume that if a meter device is experiencing conditions of elevated temperature, it may correlate with an increased frequency of other types of events such as power outage events, or voltage levels being out of bounds. Embodiments include the counts of such events over the historical period as an additional leading indicator of hot sockets. A hot socket meter may also be correlated with other types of unexpected behavior such as incorrect recording of consumed electricity. Such events are recorded as "gaps" (i.e., when the meter fails to communicate its daily reading) and "statics" (i.e., when the meter records zero consumption for the day), which are recorded in the database. These gaps and statics are examples of features that are directly used to train the machine learning model.

In embodiments, a larger set of events is used that may have a different count across the hot socket population versus the non-hot-socket population. In embodiments, there are 27 events that had different event counts across the two populations of meters.

In connection with the history of service orders 303, the jaws that connect a meter to its base may loosen causing a hot socket due to arcing if there a multiple services orders at that location that require the removal and re-insertion of a meter, over time. Therefore, it is useful to include data into the model which tracks the count of service orders over time.

In connection with the meter manufacturer data 305, certain manufacturers may have more or less tendency to generate hot sockets.

At 310, the input data is transformed into metadata/features in the dataset. For daily consumption of electricity 301, the daily kWh is transformed into two features: (1) the average daily kWh and (2) the standard deviation of daily kWh, both over the three month period or other predefined time period. For historical meter event data 302 and history of service orders 303, embodiments take the count of each historical meter event and each service order over the three month period or other predefined time period. Each of these event counts is a separate feature.

For weather temperature data 304, embodiments incorporate weather temperature into the dataset by transforming it into Heating Degree Day (count of days over the three month period or other predefined time period with temperature less than 55 degrees Fahrenheit) and Cooling Degree Day Days (count of days over the three month period or other predefined time period with temperature over 65 degrees Fahrenheit) features.

For meter manufacturer data 305, each meter manufacturer is denoted by an alphanumeric character in the raw data. To prepare this data for the dataset, each manufacturer is transformed into a separate Boolean feature. For example, in an embodiment with four different manufacturers, four different Boolean features are used to represent the manufacturers.

Embodiments pre-process all of the features in the dataset except the Boolean features. The types of pre-processing include normalization, transforms (e.g. Fourier transform) and limiting the maximum and minimum values. For example, before normalization, the average daily kWh is capped at 250 and the standard deviation of daily kWh is capped at 90 to avoid outliers affecting the results. The numbers 250 and 90 were chosen because they are two standard deviations above the average of the average daily kWh and average standard deviation of daily kWh. Features can be normalized by the min-max feature scaling, which brings all values into the range between 0 and 1. Each value is subtracted by the minimum value, which is then divided by the difference between the maximum and minimum values. After this process, each event count has a maximum value of 1 and minimum value of 0. Transforms reveal information of the underlying data in other domains (e.g. frequency) and may strengthen the predictive power of the features.

In one embodiment, the following features ("hot socket features") used to train and test the machine learning model using the five sources of data in the database are as follows in embodiments that use three months of historical data (Table 1):

TABLE 1

| # Feature | Description |
| --- | --- |
| 1. (SN) Power Failure | Count of occurrences in last 3 months, normalized |
| 2. (SN) Power Restore | Count of occurrences in last 3 months, normalized |

TABLE 1-continued

| # Feature | Description |
|---|---|
| 3. (SN) Tamper | Count of occurrences in last 3 months, normalized |
| 4. (SN) Brown Out | Count of occurrences in last 3 months, normalized |
| 5. (SN) RAM Failure | Count of occurrences in last 3 months, normalized |
| 6. (SN) High AC Volts | Count of occurrences in last 3 months, normalized |
| 7. (DR) Daily Register Gap Flag | Count of occurrences in last 3 months, normalized |
| 8. (DR) Daily Register Static Flag | Count of occurrences in last 3 months, normalized |
| 9. (DR) Daily Down Tick Flag | Count of occurrences in last 3 months, normalized |
| 10. (DR) Daily Up Tick Flag | Count of occurrences in last 3 months, normalized |
| 11. (SN) Daily Tamper | Count of occurrences in last 3 months, normalized |
| 12. (SN) Daily Brown Out | Count of occurrences in last 3 months, normalized |
| 13. (SN) Daily Meter Read Failure | Count of occurrences in last 3 months, normalized |
| 14. (SN) Daily RAM Failure | Count of occurrences in last 3 months, normalized |
| 15. (SN) Daily Meter RAM Error | Count of occurrences in last 3 months, normalized |
| 16. (SN) Daily Clock Error | Count of occurrences in last 3 months, normalized |
| 17. (SN) Daily High AC Volts | Count of occurrences in last 3 months, normalized |
| 18. (SN) Daily Power Failure | Count of occurrences in last 3 months, normalized |
| 19. SO_TYPE_CONNECT | Count of occurrences in last 3 months, normalized |
| 20. SO_TYPE_DISCONNECT | Count of occurrences in last 3 months, normalized |
| 21. SO_TYPE_CHANGE_METER_ONLY | Count of occurrences in last 3 months, normalized |
| 22. SO_TYPE_CHECK_AND_SEAL_METER | Count of occurrences in last 3 months, normalized |
| 23. SO_TYPE_METER_INVESTIGATION | Count of occurrences in last 3 months, normalized |
| 24. (SN) Internal High Voltage | Count of occurrences in last 3 months, normalized |
| 25. (SN) Daily Internal High Voltage | Count of occurrences in last 3 months, normalized |
| 26. (SN) Over Class Amps Alarm | Count of occurrences in last 3 months, normalized |
| 27. (SN) Daily Over Class Amps | Alarm Count of occurrences in last 3 months, normalized |
| 28. Average kWh | Average Daily kWh in last 3 months, capped at 250 kWh and normalized |
| 29. Standard Deviation of kWh | Standard Deviation of Daily kWh in last 3 months, capped at 90 kWh and normalized |
| 30. Heating Degree Days | Count of days with temperature below 65 degrees Fahrenheit, normalized |
| 31. Cooling Degree Days | Count of days with temperature above 55 degrees Fahrenheit, normalized |
| 32. Winter | Boolean that determines whether we are predicting for a winter hot socket (April 21-October 18) |
| 33. Meter Manufacturer | Letter or number indicating manufacturer of the meter |

At 315, the features are merge/joined and stored in a database (e.g., database 17 of FIG. 2).

At 320, the hot socket features are input to a Stage 1 for machine learning in order to train a machine learning model/classifier. This data trains the machine classifier to learn from the hot socket features in order to identify and detect a hot socket from an unknown data set.

Hot sockets are not a common occurrence across a meter population, occurring in less than 0.01% of the population, and even less during the Winter. Because of the lack of sufficient positive hot socket samples, rather than using each meter, in embodiments each occurrence of a hot socket is used as a sample. If one meter had more than one hot socket occurrence at least a week apart, then that meter would appear more than once in the positive samples. The week stagger would ensure that the data would be different so that the multiple hot socket occurrences can be considered as separate events.

Before taking on that imbalance, embodiments work with a 1:100 imbalance to train the model. Positive samples are any meters with at least one hot socket. If the meter has two or more hot sockets and each hot socket is at least a week apart, then the meter will appear more than once in the list of possible samples. The negative samples are sampled from meters in the non-hot socket population that, in a three month period, have: (1) no hot sockets; (2) at least one daily kWh read; (3) at least one of the 27 historical events or service orders.

In one embodiment, the classifier includes a machine learning algorithm that is configured to determine how likely a particular smart meter is to become a hot socket. Using the features/metadata disclosed above, the machine learning classifier learns based on observed experience. In this way, the machine learning classifier can be programmed through the provision of the detected information by which it is trained, and the classifier acquires an ability to identify smart meters with a high probability of becoming hot sockets.

Training the classifier to predict hot sockets is part of a supervised learning process. Supervised learning provides the computer an ability to recognize elements based on provided features. The computer studies the features and develops the ability to recognize new data based on the provided data. In one or more embodiments, the supervised learning algorithm may include: decision trees, a random forest, support-vector machine, Naive Bayes classifier, k-nearest neighbors, and/or linear regression.

The training the classifier can be done in an iterative fashion. In particular embodiments, after generating a training set of features, the trained classifier may be examined to determine if a desired level of prediction is achieved. If not, additional features and/or additional historical data can be used to additional train the classifier to achieve the desired level of prediction accuracy.

In one embodiment, the machine learning classifier is implemented with XGBoost. XGBoost implements machine learning algorithms under a gradient boosting framework. XGBoost provides a parallel tree boosting that solves many data science problems in a fast and accurate way. The classifier code can be implemented and run on various distributed environments such as Hadoop, SGE, and MPI.

In one embodiment, gradient boosting is a machine learning technique for regression and classification problems, which produces a prediction model in the form of an ensemble of weak prediction models, typically decision trees. Predictive modeling is the process by which a model is created to predict an outcome. If the outcome is categorical, it is called classification and if the outcome is numerical, it is called regression.

In one embodiment, a gradient boosted classifier is used and the focus is on a Summer only model. In this embodiment, the training dataset, including three months of historical data, only includes the months of March through August.

In another embodiment, a gradient boosted classifier is used as the machine learning model. Experiments for the Winter months yielded a recall of 60%, which is the proportion of actual hot sockets detected as such, and a precision of 67.606%, which is the proportion of hot sockets that were correctly classified as such out of all the meters that the model labeled as having a socket, and a false positive rate of 0.2875%. Experimental performance for the Summer months was 81.203% precision, 85.714% recall, and 0.198% false positive rate. The drop in performance in Winter is fundamentally due to the fact that hot socket occurrences are far more likely in the Summer than in the Winter, possibly due to external temperatures being lower than year-round averages.

At 325, the predicted output is generated using the trained model. The trained model receives an unknown series of data of the type used to train the model, and the machine learning classifier detects whether the unknown series of data is similar to a previous series of data that indicated a hot socket. In one embodiment, the predicted output is generated as a dataset, where each row indicates the meter identifier and a Boolean: "1" if the meter is predicted to be a hot socket, "0" if not. The dataset of historical data of Table 1 is used as input in order to generate this output. The output is a list of predictions for the month following the time period of the historical data.

In some embodiments, as an additional prediction step, the output from 325 is fed into a second machine learning model 330 with a weather model 332 and additional historical data 331 to be further categorized into: (1) weather temperature hot sockets, (2) potentially hazardous hot sockets, and (3) unknown. The second model 330 further classifies any detected hot socket from the earlier stage into two or more categories, each with a different post-detection treatment or remedial action. A weather-temperature hot socket 332 arises due to heating by meteorological factors such as direct sunlight or outdoor air temperature associated with a heat wave, while a potentially hazardous hot socket 336 is often due to equipment failure. The weather-related hot socket may be ignored while potentially hazardous ones should be investigated swiftly. Unknown hot sockets may be shelved for future investigation. Similar to machine learning model 320, model 330 can be implemented with XG Boost or other machine learning algorithms.

Weather model 332 uses current and historical weather data to inform second model 330 in its decision making. Additional data 331 may include, but is not limited to, historical electricity consumption data.

As a result of the outputs 325, 335, 336 and/or 337, the remedial actions by the utility can be taken. Remedial action can include automatically contacting the consumer to check the meter, automatically scheduling and sending a technician to inspect the meter (including interfacing with logistic systems that automatically schedule jobs, trucks, etc.), automatically disabling the meter, automatically ordering a new socket and/or smart meter and automatically scheduling installation, etc.

Figure 4:
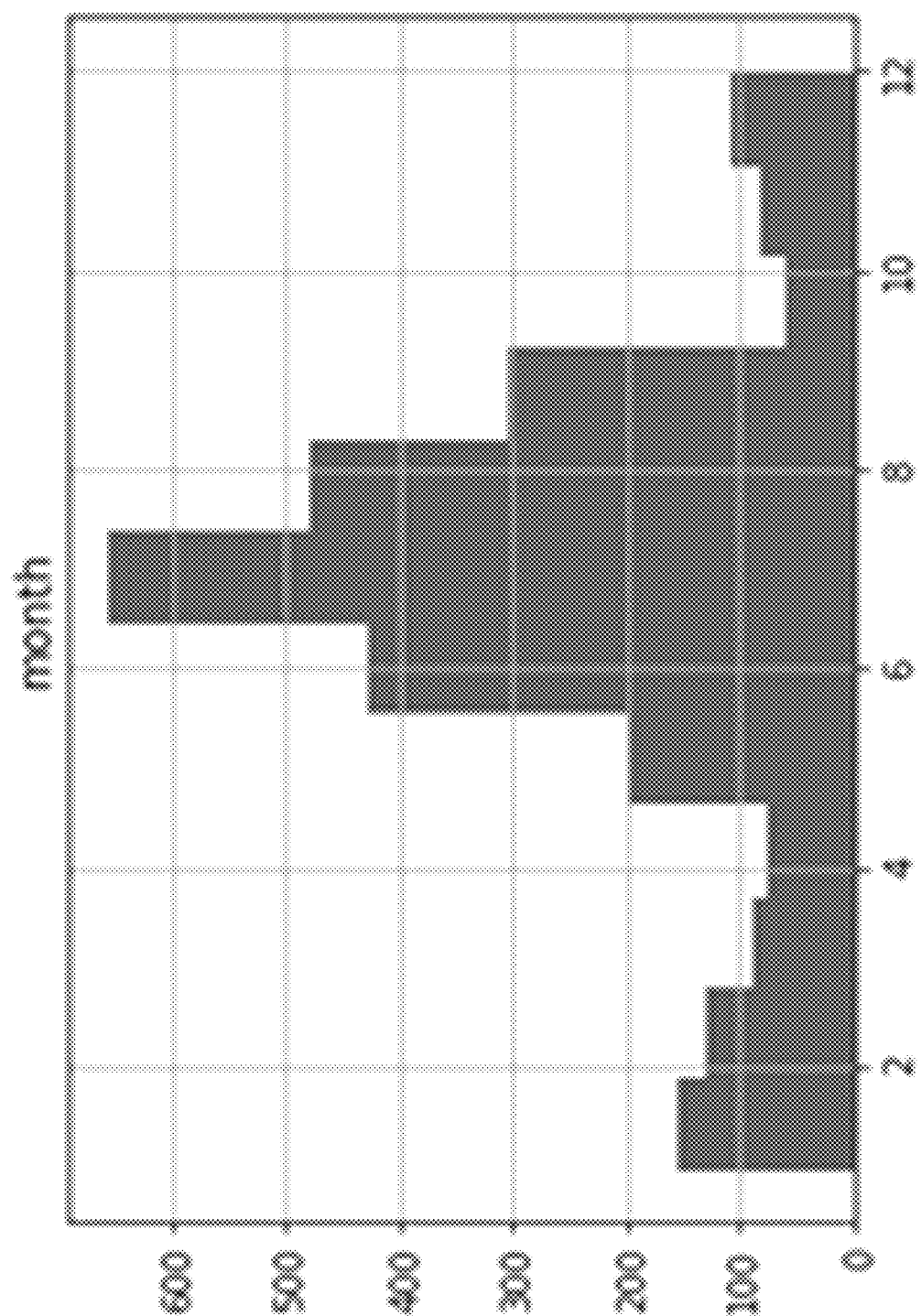
FIG. 4 is a graph illustrating the count of hot sockets (y-axis) versus month (x-axis) for the experimental results in accordance to embodiments.

FIG. 4 is a graph illustrating the count of hot sockets (y-axis) versus month (x-axis) for the experimental results in accordance to embodiments. FIG. 4 depicts the distribution of hot sockets by month, showing an obvious peak in summer.

In other embodiments, additional sources of data can be used to generate additional features to further improve the predictive accuracy of embodiments. In embodiments, additional data can include the measurement of temperature data at the meter over time (in F/C). In embodiments, the smart meter is able to store and communicate the raw temperature data over time to the database. Additional data can further include voltage data in embodiments where the smart meter will be able to store and communicate raw voltage data over time to the database. The additional data improves the predictive power of the model.

Figure 5:
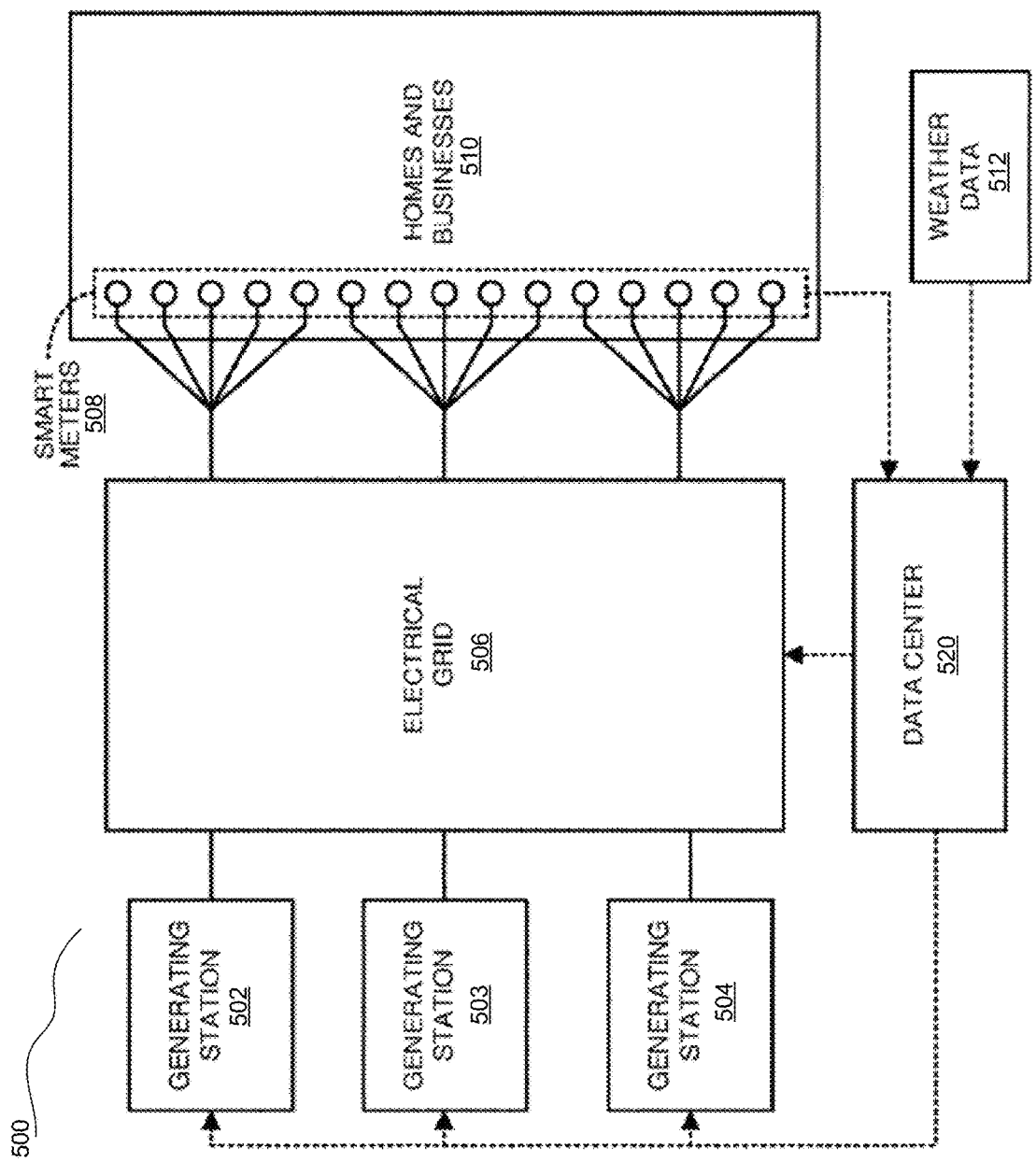
FIG. 5 illustrates an overall utility system including a set of generating stations connected to homes and businesses through an electrical grid in accordance with embodiments.

FIG. 5 illustrates an overall utility system 500 including a set of generating stations 502-504 connected to homes and businesses 510 through an electrical grid 506 in accordance with embodiments. Generating stations 502-504 can generally include any type of facility that generates electricity, such as a nuclear power plant, a solar power plant, a windmill or a windmill "farm", or a coal-fired, natural gas or oil-burning power plant. Generating stations 502-504 connect into electrical grid 506, which can transfer electricity to homes and businesses 510 within a region served by utility system 500, and can also transfer electricity to and from other utility systems. Electrical grid 506 transfers electricity to homes and businesses 510 through individual smart meters 508, which periodically transmit AMI signals containing electrical usage data, including kilowatt measurements and kilowatt-hour measurements, to a data center 520.

A control system (e.g., system 10 of FIG. 2) within data center 520 receives the AMI signals from smart meters 508 along with weather data 512, including historic, current and forecasted weather information, and produces hot socket predictions as disclosed above.

Embodiments can further use the infrastructure of FIG. 5 to generate additional smart meter based analytics, including theft detection, outage restoration, mobile workforce management for utility field workers, as well as load balancing, line loss, volt/VAR management, and predictive modeling for grid operators.

As disclosed, embodiments provide a novel solution to a problem faced by utilities that deploy smart meters capable of recording temperature, consumption and other events of interest, in conjunction with work order history. Machine learning techniques utilize a set of pre-processed features to train models that are able to predict future probable hot meters. By deploying such a solution across the population of smart meters, the utility is better positioned to reduce their overall risk exposure due to asset failure and possibly even meet regulatory requirements in their territory. The use of machine learning and models improves the prediction accuracy compared to other known solutions for predicting hot sockets, thereby providing associated advantages of either being proactive in correcting a potential hot socket before it results in a fire, or avoiding false positives and the associated costs.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of predicting an occurrence of an electrical arc between at least one of a plurality of blades and a socket among a meter installation of a plurality of smart meters, each smart meter comprising the plurality of blades adapted to be inserted into the socket, the method comprising: receiving historical data over a predefined time period from the plurality of smart meters and prior occurrences of electrical arcs for each of the plurality of smart meters, the historical data previously stored and comprising input components for each smart meter, the input components comprising: an amount of daily consumption of electricity for the meter; historical meter events for the meter; all service orders associated with the meter; meter manufacturer data; and historical weather temperature data; pre-processing the historical data to generate electrical arc features, the pre-processing comprising transforming the historical weather temperature data into a number of heating degree days and a number of cooling degree days during a predefined time period; training a first machine learning algorithm using the electrical arc features; receiving, as prediction input data for a first smart meter, one or more of the input components corresponding to the first smart meter; using the trained first machine learning algorithm and the prediction input data to predict a future occurrence of the electrical arc between at least one of the plurality of blades and the socket for the first smart meter, the predict the future occurrence of the electrical arc based on at least on the prediction input data for the first smart meter; and based on the prediction, automatically disabling the first smart meter.

2. The method of claim 1, the pre-processing comprising: transforming the daily consumption of electricity into an average daily consumption and a standard deviation of daily consumption over the predefined time period.

3. The method of claim 1, the pre-processing comprising generating a count of each historical meter event and each service order over the predefined time period, wherein the historical meter events comprise at least one of a power outage event, a voltage level being out of bounds or an incorrect reading of consumed electricity.

4. The method of claim 1, further comprising using a trained second machine learning algorithm to further characterize the predicted electrical arcs into weather temperature electrical arcs and potentially hazardous electrical arcs, the trained second machine learning algorithm using historical and current weather data for training.

5. The method of claim 1, wherein the first machine learning algorithm comprises gradient boosting.

6. The method of claim 1, further comprising: based on the prediction, replacing the first smart meter with the electrical arc with a new smart meter and/or socket.

7. A non-transitory computer readable medium having instructions stored thereon that, when executed by one or more processors, predicts an occurrence of an electrical arc between at least one of a plurality of blades and a socket among a meter installation of a plurality of smart meters, each smart meter comprising the plurality of blades adapted to be inserted into the socket, the predicting comprising: receiving historical data over a predefined time period and prior occurrences of electrical arcs for each of the plurality of smart meters, the historical data previously stored and comprising input components for each smart meter, the input components comprising: an amount of daily consumption of electricity for the meter; historical meter events for the meter; all service orders associated with the meter; meter manufacturer data; and historical weather temperature data; pre-processing the historical data to generate electrical arc features, the pre-processing comprising transforming the historical weather temperature data into a number of heating degree days and a number of cooling degree days during a predefined time period; training a first machine learning algorithm using the electrical arc features; receiving, as prediction input data for a first smart meter, one or more of the input components corresponding to the first smart meter; using the trained first machine learning algorithm and the prediction input data to predict a future occurrence of the electrical arc between at least one of the plurality of blades and the socket for the first smart meter, the predict the future occurrence of the electrical arc based on at least on the prediction input data for the first smart meter; and based on the prediction, automatically disabling the first smart meter.

8. The computer readable medium of claim 7, the pre-processing comprising: transforming the daily consumption of electricity into an average daily consumption and a standard deviation of daily consumption over the predefined time period.

9. The computer readable medium of claim 7, the pre-processing comprising generating a count of each historical meter event and each service order over the predefined time period, wherein the historical meter events comprise at least one of a power outage event, a voltage level being out of bounds or an incorrect reading of consumed electricity.

10. The computer readable medium of claim 7, further comprising using a trained second machine learning algorithm to further characterize the predicted electrical arcs into weather temperature electrical arcs and potentially hazardous electrical arcs, the trained second machine learning algorithm using historical and current weather data for training.

11. The computer readable medium of claim 7, wherein the first machine learning algorithm comprises gradient boosting.

12. The computer readable medium of claim 7, further comprising:
based on the prediction, replacing the first smart meter with the electrical arc with a new smart meter and/or socket.

13. A smart meter installation comprising: a plurality of smart meters installed in a plurality of sockets, each smart meter comprising a plurality of blades adapted to be inserted into a corresponding socket; a communication network coupled to the smart meters; an electrical grid coupled to the smart meters; a database storing historical data received from the communication network over a predefined time period from the plurality of smart meters, and prior occurrences of electrical arcs for each of the plurality of smart meters, the historical data previously stored and comprising input components for each smart meter, the input components comprising: an amount of daily consumption of electricity for the meter; historical meter events for the meter; all service orders associated with the meter; meter manufacturer data; and historical weather temperature data; one or more processors that pre-process the historical data to generate electrical arc features, the pre-process comprising transforming the historical weather temperature data into a number of heating degree days and a number of cooling degree days during a predefined time period, train a first machine learning algorithm using the electrical arc features, receive as prediction input data for a first smart meter one or more of the input components corresponding to the first smart meter and use the trained first machine learning algorithm and the prediction input data to predict a future occurrence of the electrical arc between at least one of the plurality of blades and the socket for the first smart meter, the predict the future occurrence of the electrical arc based on at least on the prediction input data for the first smart meter and based on the prediction, automatically disabling the first smart meter.

14. The smart meter installation of claim 13, the pre-processing comprising:
transforming the daily consumption of electricity into an average daily consumption and a standard deviation of daily consumption over the predefined time period.

15. The smart meter installation of claim 13, the pre-processing comprising generating a count of each historical meter event and each service order over the predefined time period, wherein the historical meter events comprise at least one of a power outage event, a voltage level being out of bounds or an incorrect reading of consumed electricity.

16. The smart meter installation of claim 13, further comprising using a trained second machine learning algorithm to further characterize the predicted electrical arcs into weather temperature electrical arcs and potentially hazardous electrical arcs, the trained second machine learning algorithm using historical and current weather data for training.

17. The smart meter installation of claim 13, wherein the first machine learning algorithm comprises gradient boosting.

* * * * *

UNITED STATES PATENT AND TRADEMARK OFFICE
CERTIFICATE OF CORRECTION

| | | |
|---|---|---|
| PATENT NO. | : 12,293,317 B2 | Page 1 of 1 |
| APPLICATION NO. | : 16/516615 | |
| DATED | : May 6, 2025 | |
| INVENTOR(S) | : Liu et al. | |

It is certified that error appears in the above-identified patent and that said Letters Patent is hereby corrected as shown below:

On the Title Page

Column 2, under other publication, Line 1, delete "leammetering," and insert -- learnmetering, --, therefor.

Signed and Sealed this
Twenty-second Day of July, 2025

Coke Morgan Stewart
*Acting Director of the United States Patent and Trademark Office*